No. 896,204. PATENTED AUG. 18, 1908.
J. H. GLAUBER.
GASKET.
APPLICATION FILED MAY 25, 1906.

ATTEST
E. M. Fisher
F. O. Musson

INVENTOR
Joseph H. Glauber,
By Fisher & Morrow ATTYS.

UNITED STATES PATENT OFFICE.

JOSEPH H. GLAUBER, OF CLEVELAND, OHIO.

GASKET.

No. 896,204.     Specification of Letters Patent.     Patented Aug. 18, 1908.

Application filed May 25, 1906. Serial No. 318,652.

*To all whom it may concern:*

Be it known that I, JOSEPH H. GLAUBER, a citizen of the United States, residing at Cleveland, in the county of Cuyahoga and State of Ohio, have invented certain new and useful Improvements in Gaskets, and do declare the following is a full, clear, and exact description of the invention, which will enable others skilled in the art to which it appertains to make and use the same.

My invention relates to improvements in gaskets, and the invention consists in a gasket body of flexible material provided with a metallic seat or seating portion at one end, the same constituting a new article of manufacture and sale, all substantially as shown and described and particularly pointed out in the claims.

Figure 1:
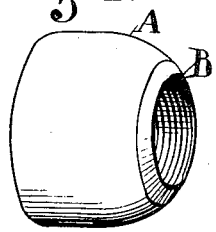
Figure 2:
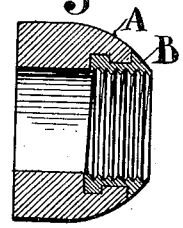
Figure 3:
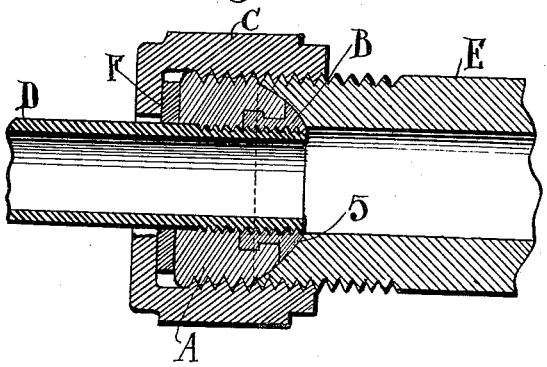

In the accompanying drawings Figure 1 is a perspective view of the gasket complete, and Fig. 2 is a sectional view of one half of the same lengthwise. Fig. 3 is a sectional elevation of a gasket and one form of the fittings with which the gasket is adapted to be used, and Fig. 4 is a sectional elevation of the gasket and modified form of fitting.

The gasket as thus shown comprises two separate parts or portions A and B, which are mechanically united and constitute a single article for sale and use. As such the body A is elastic or flexible and of substantially thimble shape, and the metallic seat or seating portion B is fixed in the front or forward end thereof. The said portion or body A is preferably made of rubber, while the said seating portion is preferably of brass though it may be of any comparatively soft metal or composition of metals. These two portions or elements are mechanically united by mounting the seat B in body A by a suitable interlocking connection, whereby the said seat is permanently but removably fixed in said body. Furthermore, the said seat or seating portion and said body have the same internal bore or cross section, and said seat is preferably threaded inside but not necessarily, and is also preferably rounded or tapered at its front, where it projects in advance of body A, as herein shown, and the said body is shown as conforming to the taper of the front of said seat. This construction enables the complete article to be used in pipe connections where a fluid tight joint is desired and the meeting parts are adapted to the use of such a gasket. If the said metallic seat and the part on which it is seated be properly fitted to each other the joint so made will be rendered fluid tight when the parts are locked together with the usual coupling nut, and this enables me to employ this article with liquids which have a deteriorating effect on rubber or like gaskets, the metallic seat B taking the place of exposure and protecting the rubber body A.

Figure 4:
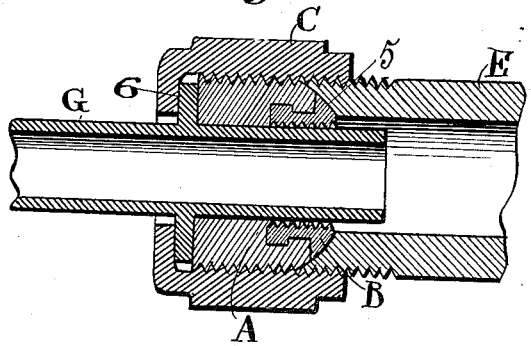

In Figs. 3 and 4, D represents a portion of a pipe which is threaded externally at its end and adapted to have the said gasket screwed thereon, and E is an end of opposite pipe of larger cross-section with a more or less rounded seat 5 corresponding to the tapered end of the gasket and threaded externally and adapted to be engaged by coupling nut C. F represents a washer interposed between the said gasket and the immediate end of pipe E and against which the gasket A is adapted to bear.

In Fig. 4 the construction is so far modified that pipe G corresponding to pipe D in Fig. 3, has a fixed plane 6 and a smooth exterior over which the gasket is sleeved and bears against said flange. In either case as the coupling nut is tightened the gasket is compressed, and being elastic expands more or less in the threads of the pipes wherever the threads are exposed. The initial seating and sealing is against the metallic portion of the gasket and the ultimate and effective sealing is by the yielding portion thereof.

What I claim is:—

1. As a new article of manufacture, a gasket consisting of a yielding body and a metallic seating portion removably fixed therein and projecting in advance of said body at its center and its outer surface conforming to the curvature of said body, and said parts having a uniform internal bore adapted to make a tight seat on a pipe fitting.

2. As a new article of manufacture, a gasket comprising a compressible body gradually tapered at its seating end and a metallic seating portion fixed centrally in the front of said body and extending forward therefrom to seat in advance thereof, said seating portion having both its outer and its inner surfaces flush with the corresponding surfaces of said body and constituting an essential portion thereof.

3. A gasket consisting of a rubber body of substantially thimble shape having an advance metallic seating portion fixed therein and threaded internally, the said seating portion engaged within the front central portion of said rubber body and the bore of the said parts substantially the same.

In testimony whereof I sign this specification in the presence of two witnesses.

JOSEPH H. GLAUBER.

Witnesses:
R. B. MOSER,
C. A. SELL.